LEVELLING CIRCUITS FOR TELEVISION

Filed Dec. 2, 1952 2 Sheets-Sheet 1

Inventor
RONALD THOMAS CLAYDEN
By Ralph E. Atherton
Attorney

July 15, 1958 R. T. CLAYDEN 2,843,665

LEVELLING CIRCUITS FOR TELEVISION

Filed Dec. 2, 1952

2 Sheets-Sheet 2

Inventor
RONALD THOMAS CLAYDEN
By Ralph E. Atherton
Attorney 2,843,665

LEVELLING CIRCUITS FOR TELEVISION

Ronald Thomas Clayden, East Sheen, London, England, assignor to Electric & Musical Industries Limited, Hayes, Middlesex, England, a company of Great Britain Application December 2, 1952, Serial No. 323,606

Claims priority, application Great Britain December 5, 1951

9 Claims. (Cl. 178—7.2)

Figure 1:
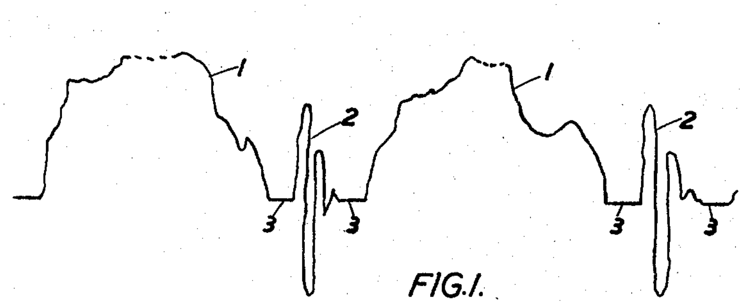

The present invention relates to levelling circuits and has particular but not exclusive reference to the levelling of television signals derived from a pick-up tube of low velocity type such as is described in the Proceedings of the Institution of Electrical Engineers, volume 97, part III, No. 50, page 383 et seq.

As is well known, the process of levelling is necessary in television transmission in order to restore the D. C. component of the signals partially or completely lost by the couplings of the television channel. The process also serves to eliminate from the television signals undesired signals of low frequency such as ripple signals incompletely filtered from the supply circuits or otherwise induced in the channel. Signals of relatively low frequency such as so-called microphony signals may also be eliminated or reduced by the action of levelling. In the absence of levelling and in the conditions that normally apply in practice there is no unique relationship between signal intensity and light intensity; on the other hand this relationship is normally required to be present.

When using a low velocity pick-up tube of the kind referred to in a television channel the practice has been adopted of employing those portions of the signals derived from the tube that correspond to inter-line blanking periods for the purpose of levelling the signals. For this purpose a circuit of the "clamp" type as described in the specification of United States Patent No. 2,190,753 may be utilised, the circuit being switched into operation during the line blanking periods. By choosing the time constant of the clamp action sufficiently large the levelling process may be caused to operate substantially independently of the random noise ordinarily present in the channel. Furthermore, if the time constant is not made of too large magnitude the clamping action is not prevented from eliminating undesired low frequency signals, for instance, power supply ripple and microphony signals. It is found, however, that with low velocity pick-up tubes of the kind referred to spurious signals of oscillatory character can appear in the output of the tube during line return periods and while the integrating action of the clamp circuit causes it to function in a measure independently of such spurious signals the levelling process is nevertheless affected by the spurious signals and when, as is apt to happen in practice, changes occur in the amplitude of the spurious signals, the television signals suffer a corresponding change of level. Signals of amplitude representative for instance of near black may then be depressed below the level of black so that detail in the darker portions of the picture is lost; alternatively, the tone levels of the picture may be falsely elevated.

In the specification of United States patent application Serial No. 74,587 there is proposed a method of avoiding this kind of disturbance and this method utilises signals generated in the output of the pick-up tube during inter-field blanking periods but excluding periods of line return occurring during the inter-field blanking periods. These signals are, in the instance of the low velocity pick-up tube of the kind referred to and contemplated in the aforesaid application, free of spurious signals and representative of true black and according to the invention of the aforesaid application said signals are employed for the purpose of levelling the picture signals of the television channel. Such levelling, however, is effective only at field repetition frequency and it follows, therefore, that the method is not suitable where it is necessary to reduce the effect of such undesired low frequency signals as supply ripple and microphony signals.

It is an object of the present invention to provide a levelling circuit capable of overcoming difficulties such as those mentioned above.

A further object of the present invention is to provide a levelling circuit for television and like signals in which the levelling is performed at a relatively high frequency, such as line frequency, and inaccuracy in the levelling due to interference by spurious signals is reduced in dependence upon observations made on datum portions of the signals at a lower frequency, for instance at frame frequency.

A further object of the present invention is to provide a circuit for levelling electrical signals representing an image and including line scan portions separated by line blanking portions and frame blanking portions wherein the signals are aligned with a reference potential during the line blanking portions and wherein the level of the signals during frame blanking portions is observed and said reference potential is adjusted in dependence upon the observed level.

According to the present invention there is provided a circuit for deriving electrical signals representing an image and for levelling said signals, comprising an image pick-up target, means for generating an electron beam directed at said target, deflecting means for scanning said target with said beam, said deflecting means comprising means for producing a first scanning waveform including line scanning portions and line return portions and a second scanning waveform including field scanning portions and field return portions, means for switching on said beam during line scanning intervals each including a major part of a line scanning waveform portion, means for switching off said beam during interline intervals each including a line return waveform portion and a minor part of a line scanning waveform portion, and during inter-field intervals each including a field return waveform portion, a path for deriving electrical output signals from said target, said output signals comprising image signals during said line scanning intervals and blanking signals during said inter-line and inter-field intervals, a series condenser in said path, a source of reference potential, normally open switch means closable to connect the output side of said condenser to said source of reference potential, means for closing said switch means during major portions of said inter-line intervals which include line return waveform portions to level said output signals with reference to said reference potential, observing means separate from said switch means and connected to said path for deriving a potential representing the level of portions of said blanking signals derived during intervals excluding said line return waveform portions, and means for adjusting said reference potential in response to said derived potential.

Figure 2:
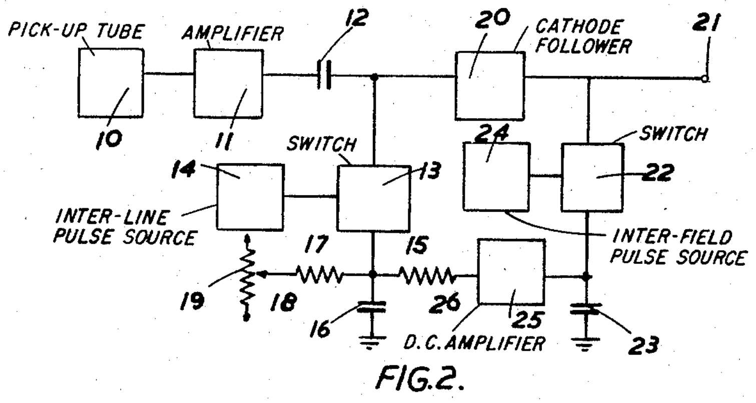
Figure 3:
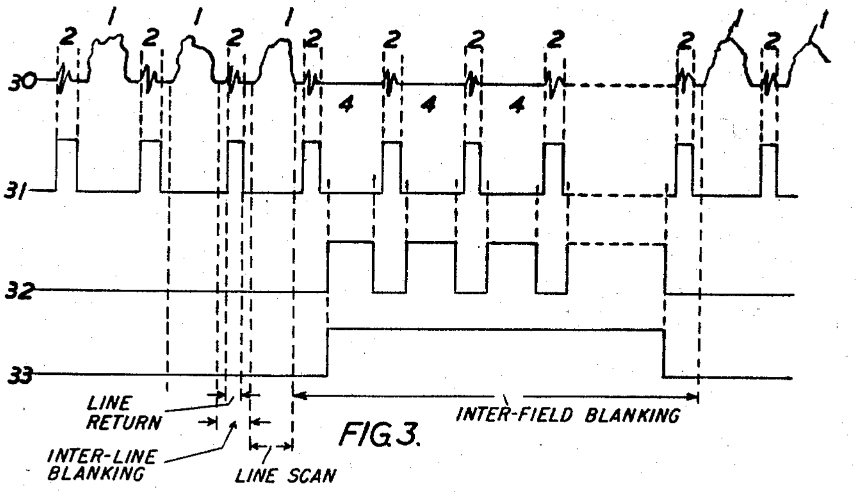
Figures 4, 5A, 5B, 5C, 6:
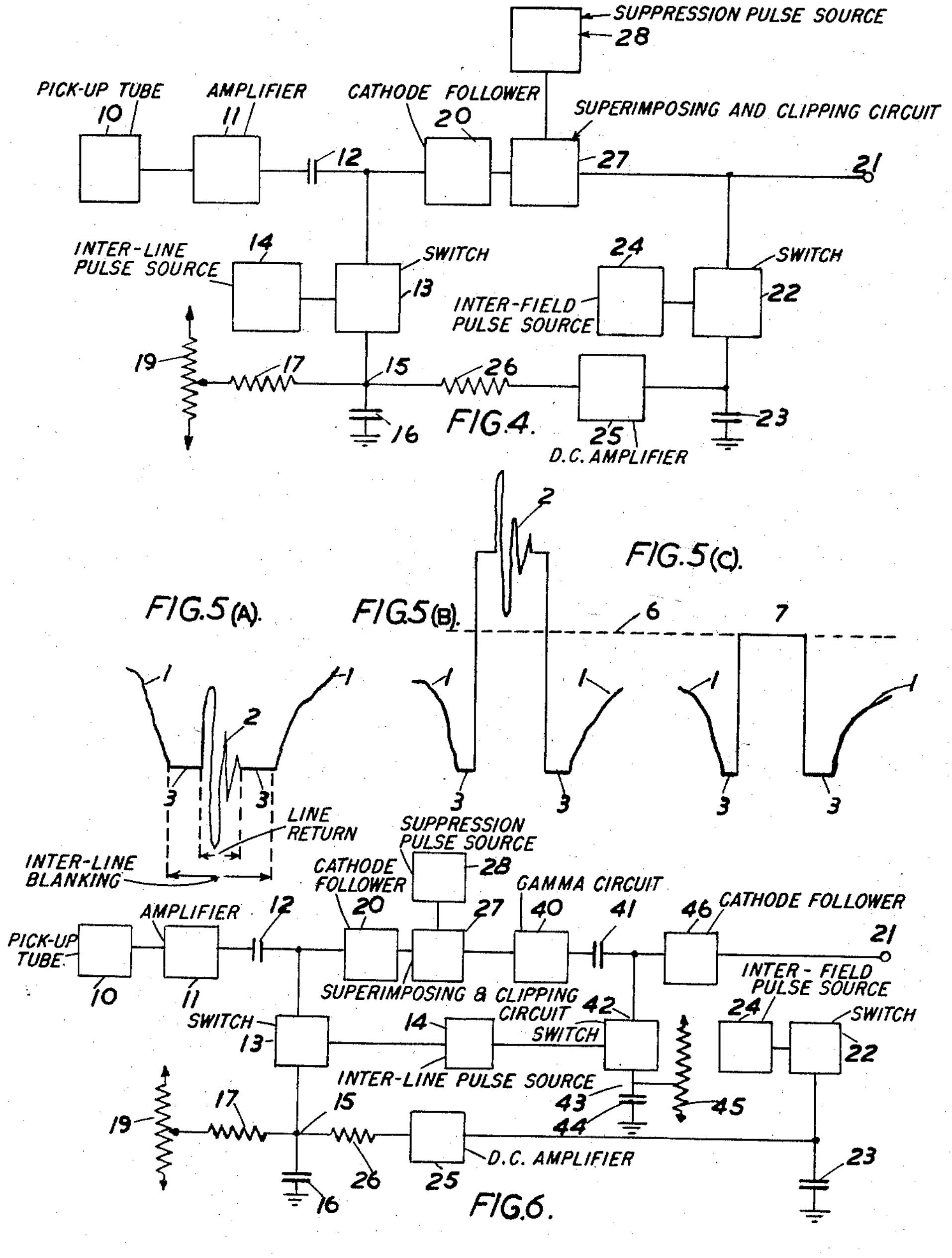

In order that the invention may be more clearly understood and readily carried into effect the same will now be described in more detail by way of example with reference to the accompanying drawings, in which:

Figure 1 illustrates portions of output signals from a television pick-up tube of the kind referred to and shows in particular the character of said spurious signals, Figure 2 illustrates diagrammatically and partly in block form one embodiment of the invention, Figure 3 illustrates explanatory waveforms, Figure 4 illustrates diagrammatically and partly in block form a further embodiment of the invention, Figure 5 illustrates further explanatory waveforms, and Figure 6 illustrates diagrammatically and partly in block form another embodiment of the invention.

Referring to Figure 1 the reference numeral 1 indicates a fragment of the television picture signals such as might be generated by a low velocity pick-up tube of the kind referred to in the process of scanning the lines of the picture and the reference numeral 2 indicates spurious signals of the oscillatory character mentioned which arise due to the return stroke of the beam in between the scanning of the picture lines. In the absence of the spurious signals 2 the signal output from tube would assume for the whole period of the inter-line blanking periods the level indicated by the reference numeral 3 in the figure. This level corresponds to black in the picture and in the absence of the spurious signals 2 the black level portions of the signals occurring between picture signals of consecutive lines could be employed for accurate levelling of the pick-up tube signals subsequently in the picture channel when the signals have suffered partial or complete loss of D. C. component. As indicated in Figure 1 the spurious signals 2 are of a damped oscillatory character and this being so it is possible with some measure of accuracy to utilise the portions of the signals from the tube corresponding to the inter-line blanking intervals to perform levelling by means of a clamping type levelling circuit such as is described, for example, in the specification of United States Patent No. 2,190,753 and by taking advantage of the integrating action of the circuit. Levelling carried out in this way, however, is dependent to some degree on the spurious signals and these signals are liable to change and in consequence the levelling is subject to errors of appreciable magnitude. The arrangement of Figure 2 provides means in accordance with the invention by which these errors may be substantially eliminated.

Referring to Figure 2, the block denoted by numeral 10 represents a pick-up tube of the type referred to having operative connections such that the output of the tubes comprises signals such as the signals in Figure 1 are generated. As is well known, a tube of the type referred to has an image pick-up target and means for generating an electron beam directed with a low velocity at the target. The operative connections comprise deflecting means for scanning the target with the beam, the deflecting means comprising means for producing a first scanning waveform including line scanning portions and line return portions and a second scanning waveform including field scanning portions and field return portions. The operative connections further include means for switching on the beam during line scanning intervals each of which includes a major part of a line scanning waveform portion, and means for switching off the beam during inter-line intervals each including a line return waveform portion and a minor part of the line scanning waveform portion. The beam switching means is also such as to switch off the beam during inter-field intervals each including a field return waveform portion. Signals from the pick-up tube 10 are applied to the amplifier 11, this amplifier including several amplifier stages coupled by couplings of A. C. type as a result of which the signals fed out from the amplifier do not contain the D. C. component. For the purpose of restoring this component the condenser 12 is connected in series in the channel, and subsequently to condenser 12 the switching circuit 13 is connected in shunt in the channel. The condenser 12 and switching circuit 13 constitute a clamping circuit of the kind described in the specification of United States Patent No. 2,190,753 and the switching circuit 13 may take the form of a four-diode bridge circuit as disclosed in the specification of United States Patent No. 2,258,732. The switching circuit 13 is controlled by pulses from the pulse source 14 which may be of the form described in United States Patent No. 2,266,154 so that during the application of any one of said pulses the switching circuit 13 provides a conducting connection between the terminal of the condenser 12 connected to it and a point 15 of the potential which is automatically controlled in a manner to be explained hereinafter. Said point 15 is connected to ground via the capacity 16 which serves to prevent variations of potential of line repetition or higher frequency appearing at the point 15, and the point is also connected via the resistance 17 to the slider 18 of the potentiometer 19 by means of which the potential of the point 15 can be manually adjusted. Said controlling pulses are regularly recurring and of equal duration and cause the switching circuit 13 to be conductive for intervals during the inter-line blanking periods in the scanning of the pick-up tube 10. Said intervals may be of 10 microseconds duration and are such as to include the spurious signals 2. The timing of said controlling pulses is illustrated with reference to waveforms 30 and 31 of Figure 3 in which waveform 30 shows a train of signals generated by the pick-up tube 10 and the waveform 31 indicates a succession of the said pulses. In the waveform 30 there are shown picture signals indicated by said reference numeral 1, as in Figure 1, and there are furthermore indicated by the reference numeral 2, as in Figure 1, the spurious signals that occur during line return periods in the scanning of the pick-up tube 10. Said spurious signals are regularly occurring and as indicated by the waveform 30 appear in the output of the pick-up tube not only in the blanking intervals between the picture signals of consecutive lines but also in line return periods occurring during the inter-field blanking periods of the scanning beam when no picture signals are generated. Spurious signals occurring during inter-field blanking periods are shown in waveform 30 lying between signal portions such as are indicated by reference numerals 4. These latter portions correspond to picture black. As indicated by the waveform 31 the pulses generated by the pulse source 14 occur during intervals embracing the occurrence of the spurious signals 2.

The action of the clamping circuit 12, 13 is such as to level the signals appearing at the terminal of the condenser 12 connected to the switching circuit 13 so that the portions 3 of the signals are aligned during the inter-line blanking periods at a potential which is approximately that of the potential of the point 15. The signals levelled in this manner are applied to the amplifier 20 which is constituted by a cathode follower circuit repeating the signals at the output terminal 21. In order that the levelling shall not be appreciably affected by the inevitable random noise of the signal channel the effective time constant associated with the condenser 12 when the switching circuit 13 is rendered conducting is chosen sufficiently large but not so large that the clamping action is rendered incapable of removing power supply ripple and microphony signals. Thus said time constant may be selected to be of the order of 10 microseconds. With a time constant of this order the clamping circuit 12, 13 possesses an integrative action that largely reduces the disturbing effect of the spurious signals 2 upon the levelling. Nevertheless, this disturbing effect is not satisfactorily eliminated and variations of the spurious signals result in undesired variation in the level of the aligned signals.

In order to reduce these undesired variations there is provided the further switching circuit 22 connected on the one hand to the terminal 21 and to ground through a storage condenser 23 on the other. The switching circuit 22 may be constituted by a four-diode bridge as in the instance of the switching circuit 13 and the circuit is controlled by pulses generated by the pulse source 24 which may be of similar construction to the pulse source 14. This source sets up pulses having a waveform such as is shown by waveform 32 of Figure 3, these pulses occurring during inter-field blanking of the scanning beam of the pick-up tube 10 but not during the occurrence of the spurious signals 2. During the application of the controlling pulses from the pulse source 24 the switching circuit is caused to be conductive and to connect the terminal 21 to the storage condenser 23 so that there is set up across the condenser 23 a difference of potential representative of the level of the signal portions 4 of the waveform 30.

The potential difference set up across the condenser 23 is applied to the D. C. amplifier 25 which amplifies variations in said potential with inversion of sense and the amplified variations are applied to the point 15 via the resistance 26 so as to automatically control the potential of said point. This automatic control serves to correct the levelling effected by the clamping circuit 12, 13 so that all signal portions corresponding to black are brought substantially to the same level at the terminal 21 irrespective of variations of the spurious signals 2 tending to cause inaccuracies of levelling.

Figure 4 shows a modification of the arrangement described with reference to Figure 2. In this modification reference numerals that are the same as numerals in Figure 2 have a similar significance. The modification is essentially constituted by the inclusion of a circuit 27 inserted in the signal channel between the output of the cathode follower stage 20 and the switching circuit 22. The circuit 27 has the function of displacing or suppressing the spurious signals 2 and has for one object the simplification of the operation of the switching circuit 22. Thus, pulses occurring at line repetition frequency and generated by the source 28 are fed to the circuit 27. These pulses occur during intervals embracing the occurrence of the spurious signals and are applied to the circuit 27 so that they are superimposed on the signals in the channel and cause the spurious signals to be displaced in the direction of increasing white. The amplitude of the superimposed pulses is chosen of such sufficiently large magnitude that the most extreme portion of the spurious signals extending in the direction towards black does not extend as far as black. This is shown in Figure *5b*, Figure *5a* showing a portion of the signal waveform prior to the superposition of one of the pulses from the pulse source 28. In this latter figure the spurious signal 2 is shown occurring at the inter-blanking period between trains of picture signals 1 of consecutive scanning lines. Figure *5b* shows the superimposed pulse 5 carrying superposed on it in turn the displaced spurious signal 2 indicated by the reference numeral 2'. The displacement of the spurious signal 2 it will be seen is in the direction of increasing white and the most extreme portion of the displaced signal 2' in the direction of black falls short of black by a considerable extent. In these circumstances the switching circuit 22 may be simplified so that it consists of only a single diode which, when conducting, will operate as a negative peak rectifier and thus need not be rendered nonconducting for periods during the occurrence of spurious signals as is the case in the arrangement in Figure 2. Thus whereas in the arrangement of Figure 2 the controlling pulse waveform for switching the switching circuit 22 into the conducting condition has an interrupted character as shown in the waveform 32 of Figure 3, in the arrangement of Figure 4 the non-interrupted waveform 33 of Figure 3 is the waveform of the pulses generated by the pulse source 24 controlling the switching circuit 22.

In a variation of the arrangement just described, which is useful if a signal has to be levelled a second time it is arranged that the amplitude of the pulses derived from the pulse source 28 and superposed on the signals of the signal channel is sufficiently great so that no part of the displaced spurious signal 2' extends into the region of the picture signals 1. In Figure *5b* the level shown by the dotted line 6 is a level above that of the whitest signal occurring in the channel, and the amplitude of the superposed pulse is such that no part of the spurious signals 2' extends below the level 6. In said variation the circuit 27 includes a clipping circuit connected in the channel immediately following the point at which the pulses from the source 28 are superposed on the signals of the signal channel and this clipping circuit is arranged to clip at the level 6 so that all signals lying above the level 6 are suppressed. Figure *5c* shows the form of the signals of Figure *5b* after the signals have been clipped by said clipping circuit, the pulses 5 after clipping being indicated by the reference 5'. The top portion 7 of the pulses 5' is shown at the level of the clipping level 6. The circuit 27 may be of the construction described in United States Patent No. 2,212,199.

The arrangement of Figure 6 shows a development of the arrangement of Figure 4 based on the variation just described reference numerals in Figure 6 that are the same as numerals in Figure 4 having a similar significance. Referring to Figure 6, there is included in the signal channel immediately following the output of the clipper circuit incorporated in the circuit 27 a circuit 40 which may take the form of an amplifier or a gamma correction circuit or a combination in series of both such circuits. The gamma correction circuit may be of the construction described in United States Patent No. 2,222,933. The couplings of the circuit 40 are such that the whole or part of the D. C. component of the signals transmitted by the circuit is lost in transmission through the circuit. The signals thus appearing in the output of the circuit 40 are no longer levelled and in these circumstances the automatic control of the potential of the point 15 by virtue of the storage signal stored in the condenser 23 would fail. In order to restore the D. C. component wholly or partially lost in transmission by the circuit 40 and thereby retain the desired automatic control at the point 15 there is provided immediately following the output of the circuit 40 a clamping circuit comprising the condenser 41 connected in series in the signal channel and immediately after this condenser the switching circuit 42 connected in shunt to the signal channel. The switching circuit 42 may be of the same form as the switching circuits 13 and 22 and is controlled by pulses from the pulse source 14 in a similar manner to the switching circuit 13. When the switching circuit 42 is rendered conducting the signal channel is connected by the circuit 42 to a point 43 and this point is arranged to be held at a suitable fixed potential by the connection of said point on the one hand to ground via the condenser 44 and on the other hand to a point on the potential divider 45. The pulses that are applied to the switching circuit 42 from the pulse source 14 are arranged to have such timing and duration that the switching circuit 42 is rendered conductive for intervals occurring within the periods during which the clipped pulses 5' as shown in *5c* occur. The portions 7 of the clipped pulses 5' thus become aligned at the level of the potential at point 43 and the D. C. component partially or wholly lost by the circuit 40 is restored at the terminal of the condenser 41 connected to the switching circuit 42. Said terminal is connected to the input of the cathode follower stage 46, the output of which is connected to the terminal 21.

What I claim is:

1. A circuit for deriving electrical signals representing an image and for levelling said signals, comprising an image pick-up target, means for generating an electron beam directed at said target, deflecting means for scanning said target with said beam, said deflecting means comprising means for producing a first scanning waveform including line scanning portions and line return portions and a second scanning waveform including field scanning portions and field return portions, means for switching on said beam during line scanning intervals each including a major part of a line scanning waveform portion, means for switching off said beam during inter-line intervals each including a line return waveform portion and a minor part of a line scanning waveform portion, and during inter-field intervals each including a field return waveform portion, a path for deriving electrical output signals from said target, said output signals comprising image signals during said line scanning intervals and blanking signals during said inter-line and inter-field intervals, a series condenser in said path, a source of reference potential, normally open switch means closable to connect the output side of said condenser to said source of reference potential, means for closing said switch means during major portions of said inter-line intervals which include line return waveform portions to level said output signals with reference to said reference potential, observing means separate from said switch means and connected to said path for deriving a potential representing the level of portions of said blanking signals derived during intervals excluding said line return waveform portions, and means for adjusting said reference potential in response to said derived potential.

2. A circuit for deriving electrical signals representing an image and for levelling said signals, comprising an image pick-up target, means for generating an electron beam directed at said target, deflecting means for scanning said target with said beam, said deflecting means comprising means for producing a first scanning waveform including line scanning portions and line return portions and a second scanning waveform including field scanning portions and field return portions, means for switching on said beam during line scanning intervals each including a major part of a line scanning waveform portion, means for switching off said beam during inter-line intervals each including a line return waveform portion and a minor part of a line scanning waveform portion, and during inter-field intervals each including a field return waveform portion, a path for deriving electrical output signals from said target, said output signals comprising image signals during said line scanning intervals and blanking signals during said inter-line and inter-field intervals, a series condenser in said path, a source of reference potential, normally open switch means closable to connect the output side of said condenser to said source of reference potential, means for closing said switch means during major portions of said inter-line intervals which include line return waveform portions to level said output signals with reference to said reference potential, observing means separate from said switching means and connected to said path for deriving a potential representing the level of portions of said blanking signals derived during said inter-field intervals and excluding said line return waveform portions, and means for adjusting said reference potential in response to said derived potential.

3. A circuit according to claim 1, said switch comprising a bi-directionally conductive switch.

4. A circuit according to claim 1, said observing means comprising a storage condenser, a connection from one side of said condenser to a point of substantially fixed potential, a normally open switch closable to connect the other side of said condenser to said path, and means for closing said switch during portions of the blanking signals derived during intervals excluding said line return waveform portions.

5. A circuit according to claim 4, said source of reference potential comprising another storage condenser, a connection from one side of said other storage condenser to a point of substantially fixed potential, and resistances connecting the other side of said condenser respectively to another point of substantially fixed potential and to said first storage condenser.

6. A circuit according to claim 1, said observing means being connected to said path at a point subsequent to said switch means.

7. A circuit according to claim 6 comprising means connected to said path between said switch means and said observing means for superimposing pulses on said blanking signals derived during intervals including said line return waveform portions said pulses being predetermined to displace the respective blanking signals beyond the amplitude range of said image signals, and means for limiting the superimposed pulses and blanking signals at a predetermined potential beyond said amplitude range.

8. A circuit according to claim 7 comprising a gamma correction circuit connected in said path subsequent to said limiting means, and means connected to said path subsequent to said gamma correction circuit for levelling the output signals in said path with reference to said superimposed pulses and blanking signals after limitation.

9. Television signal generating apparatus comprising a low velocity pick-up tube including a target and means for generating an electron beam directed with a low velocity at said target, deflecting means for scanning said target with said beam, said deflecting means comprising means for producing a first scanning waveform including line scanning portions and line return portions and a second scanning waveform including field scanning portions and field return portions, means for switching on said beam during line scanning intervals each including a major part of a line scanning waveform portion, means for switching off said beam during inter-line intervals each including a line return waveform portion and a minor part of a line scanning waveform portion and during inter-field intervals each including a field return waveform portion, a path for deriving electrical output signals from said target, said output signals comprising image signals during said line scanning intervals and blanking signals during said interline and inter-field intervals, a series condenser in said path, a source of reference potential, a normally open bi-directional conductive switch closable to connect the output side of said condenser to said source of reference potential, means for closing said switch during major portions of said inter-line blanking intervals which include line return waveform portions to level said output signals with reference to said reference potential, observing means separate from said switch and connected to said path for deriving a potential representing the level of portions of said blanking signals derived during intervals excluding said line return waveform portions, and means for adjusting said reference potential in response to said derived potential.

References Cited in the file of this patent

UNITED STATES PATENTS

| | | |
|---|---|---|
| 2,244,240 | Blumlein | June 3, 1941 |
| 2,353,018 | Duke | July 4, 1944 |
| 2,445,040 | Schade | July 13, 1948 |
| 2,564,017 | Maggio | Aug. 14, 1951 |
| 2,620,393 | Lubszynski et al. | Dec. 2, 1952 |

FOREIGN PATENTS

| | | |
|---|---|---|
| 694,725 | Germany | July 11, 1940 |